United States Patent
Dazeley et al.

(10) Patent No.: US 10,436,919 B1
(45) Date of Patent: Oct. 8, 2019

(54) METHODS AND APPARATUS FOR DIRECTIONAL DETECTION OF ANTINEUTRINOS

(71) Applicant: Lawrence Livermore National Security, LLC, Livermore, CA (US)

(72) Inventors: Steven Dazeley, San Leandro, CA (US); Marc Bergevin, Pleasant Hill, CA (US); Adam Bernstein, Palo Alto, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/920,299

(22) Filed: Mar. 13, 2018

(51) Int. Cl.
*G01T 3/06* (2006.01)
*G01T 1/20* (2006.01)
*G01T 1/29* (2006.01)

(52) U.S. Cl.
CPC ...................................... *G01T 3/06* (2013.01)

(58) Field of Classification Search
CPC ........... G01T 1/1644; G01T 1/20; G01T 3/06; G01T 1/2008; G01T 1/29
See application file for complete search history.

(56) References Cited

U.S. PATENT DOCUMENTS

| | | | | |
|---|---|---|---|---|
| 2008/0128631 A1* | 6/2008 | Suhami | ...................... | G01T 5/02 250/370.09 |
| 2009/0134334 A1* | 5/2009 | Nelson | .................. | G01T 1/2002 250/361 R |

OTHER PUBLICATIONS

Ashenfelter, J., et al., "The PROSPECT Physics Program," Dec. 7, 2015; accessed Oct. 24, 2018 from http://andv.org/pdf/152.02202v1.pdf; 17 pages.
Boireau, G., et al., "Online Monitoring of the Osiris Reactor with the Nucifer Neutrino Detector," The Nucifer Collaboration, May 25, 2016, accessed Oct. 24, 2018 from http://arxiv.org/pdf/1509.05610.pdf, 18 pages.
Bowden, N., et al., "Experimental results from an antineutrino detector for cooperative monitoring of nuclear reactors," Nuclear Instruments and Methods in Physics Research A 572 (2007), pp. 985-998.
Bowden, N., et al., "Observation of the isotopic evolution of pressurized water reactor fuel using an antineutrino detector," Journal of Applied Physics, vol. 105, Issue 6, p. 64902, 2009.

* cited by examiner

*Primary Examiner* — David P Porta
*Assistant Examiner* — Fani Boosalis
(74) *Attorney, Agent, or Firm* — Perkins Coie LLP

(57) ABSTRACT

Nuclear reactors are emitters of a fundamental particle known as an antineutrino. The antineutrinos emitted as a result of nuclear fission reactions inside a reactor core carry information about those fission reactions. To detect the antineutrinos emitted by the nuclear reactor, the exemplary detector detects a positron event followed by a neutron event. The exemplary detector can also reconstruct the direction of the detected neutron to remove events produced by cosmogenic fast neutrons from the neutrons generated by the nuclear fission.

29 Claims, 10 Drawing Sheets

METHODS AND APPARATUS FOR DIRECTIONAL DETECTION OF ANTINEUTRINOS

TECHNICAL FIELD

This patent document relates to systems, methods, and devices for detecting antineutrinos.

BACKGROUND

Nuclear reactors emit an elementary particle known as an antineutrino due to nuclear fission. An antineutrino is an anti-particle of another elementary particle known as a neutrino. The antineutrinos emitted from a reactor core carry information about the fission reactions. For instance, the fissile content of reactor cores can be estimated by monitoring the emission rate and energy spectrum of the emitted antineutrinos. Thus, antineutrinos have become an important source of information for fundamental physics research and for the nuclear non-proliferation community.

SUMMARY

This patent document describes systems, devices, and techniques for an antineutrino detector that differentiates between the antineutrino signal and signals from more common particles such as fast neutrons. Fast neutrons, which are produced in great numbers by cosmic rays near the earth's surface, are responsible for most of the background signal in today's antineutrino detectors. Normally, detectors must be located underground in order to shield from these backgrounds. The antineutrino detector described in this patent document includes a plurality of pulse shape sensitive plastic scintillator, which in some implementations are in the form of bars or rods, arranged in a way that is sensitive to the direction of the incoming antineutrino flux. Thus, a benefit of the exemplary antineutrino detector is that it can be deployed at a nuclear reactor above-ground with reduced shielding requirements.

An exemplary embodiment discloses a particle detector. The particle detector comprises a plurality of optical bundle modules, each optical bundle module comprising a plurality of individual scintillators arranged in a vertical orientation and separated from one another within the optical bundle module. The particle detector includes one or more photomultiplier tubes coupled to the plurality of scintillators. The one or more photomultiplier tubes is configured to receive light from one or more of the scintillators produced in response to interactions of a particle or a ray emanating from an antineutrino interaction with the one or more scintillators and to generate an associated electrical signal. The particle detector includes a signal processing unit comprising a processor and a memory including instructions stored thereon, the signal processing unit coupled to the one or more photomultiplier tubes to receive electrical signals associated with the interactions of the particle or a ray with the one or more scintillators, wherein the instructions upon execution by the processor configure the signal processing unit to identify the particle or the ray based on a number of scintillators producing electrical signals in response to the particle or the ray, a direction of detections produced in response to the particle or the ray, or a pulse shape associated with the detected particle or ray.

Another exemplary embodiment discloses a method for detecting an antineutrino. The exemplary method comprises detecting optical signals from a plurality of scintillators indicative of detection of a positron followed by a detection of a neutron. The optical signal indicative of detection of the neutron produces an electrical signal having a particular pulse shape characteristic that is different from pulse shape characteristic associated with background environmental radiation and is detected from a single scintillator bar. The method further includes detecting locations of the positron and the neutron within the plurality of the scintillators, computing a direction vector based on the detected locations of the positron and neutron, and distinguishing, based on the pulse shape and the direction vector, the antineutrino from detections associated with background environmental radiation.

These and other aspects and features are described in greater detail in the drawings, the description, and the claims.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or systems. Rather, use of the word exemplary is intended to present concepts in a concrete manner.

Nuclear reactors produce a type of neutrino known as an electron antineutrino. Neutrinos have extremely small interaction cross-sections. Thus, detection of neutrinos requires either a luminous source, or a large detector, or both. Nuclear reactors are one of the most luminous sources of antineutrinos on earth. As a result, both physicists and nuclear non-proliferation community desire to place antineutrino detectors close to the core of a reactor in order to maximize the detected flux. However, detecting antineutrinos a few meters from a reactor core is extremely challenging not only because reactors are radioactive, but also because the high flux of cosmogenic neutrons at the surface of the earth are an important source of background.

The primary source of antineutrino background is caused by cosmic rays, which produce fast neutrons. Fast neutrons can produce signals in an antineutrino detector that appear very similar to antineutrinos. Thus, conventional antineutrino detectors require large volumes of shielding from cosmic neutron background and are deployed underground where the rate of the cosmic rays is lower.

Currently, antineutrino detectors within close proximity to a reactor core are deployed at a depth of approximately 10-100 meters and use thick shields to attenuate the cosmogenic neutron background. Often the shielding comprises approximately 90% of the total detector volume. For deployments near a reactor, this requirement increases overall detector size and therefore severely limits deployment options. Even where a location is available, the current technology may be a burden for the reactor operators due to the relatively large size of the detector and shielding materials and due to the inconvenient access required to underground space near the reactor. For example, present day antineutrino detectors can range from 10-20 cubic meters. For example, the San Onofre Nuclear Generating Station (SONGS) antineutrino detector was deployed under about 10 meters of concrete and comprised approximately 95% shielding material.

The disclosed embodiments address these and other issues associated with the existing antineutrino detector technology by providing antineutrino detectors that can be deployed at a nuclear reactor above-ground with reduced shielding requirements while differentiating between antineutrino and the more common fast neutrons. Further details regarding the systems, devices and methods of the disclosed technology are described in the sections that follow.

Exemplary Detector Design and Characteristics

Figures 1A, 1B:
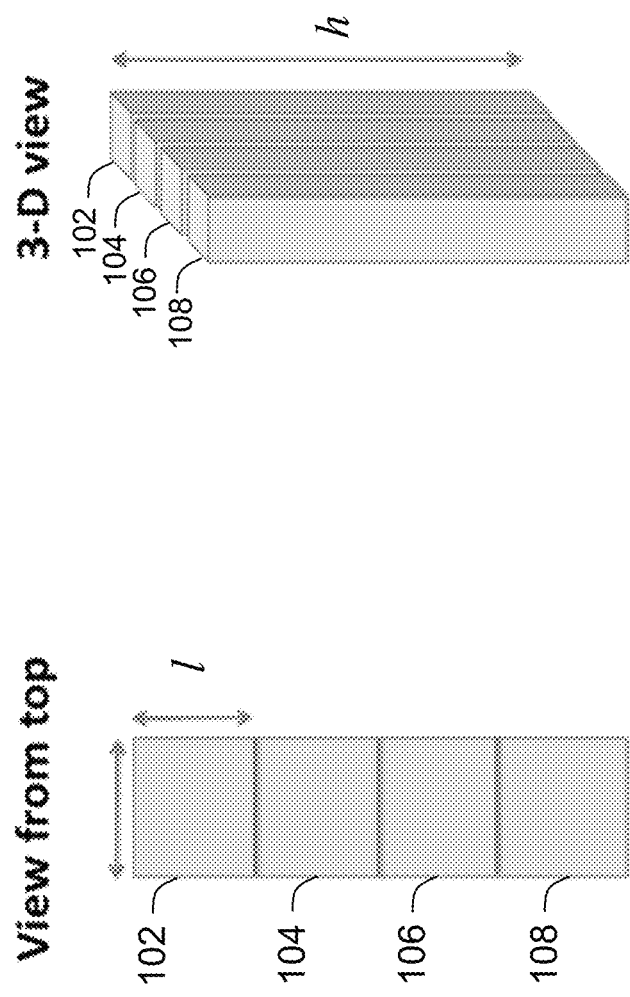
FIG. 1A shows a top view of an exemplary detector comprising four bundle modules arranged in a line.
FIG. 1B shows three-dimensional view of an exemplary detector comprising four bundle modules.

FIGS. 1A and 1B show, respectively, a top view and a three-dimensional view of a set of four exemplary scintillator bar or rod bundle modules ((102) to (108)) that form part of a detector that can be located in various neutron and gamma ray fields above ground next to a nuclear reactor containment vessel. Since the modules are self-contained, any number of modules can be deployed at a given location, depending on the event rate that is required and the available reactor flux. In some embodiments, the exemplary detector may include fewer or additional bundle modules. For instance, the exemplary detectors may include between five and ten bundle modules, inclusive.

Figure 1C:
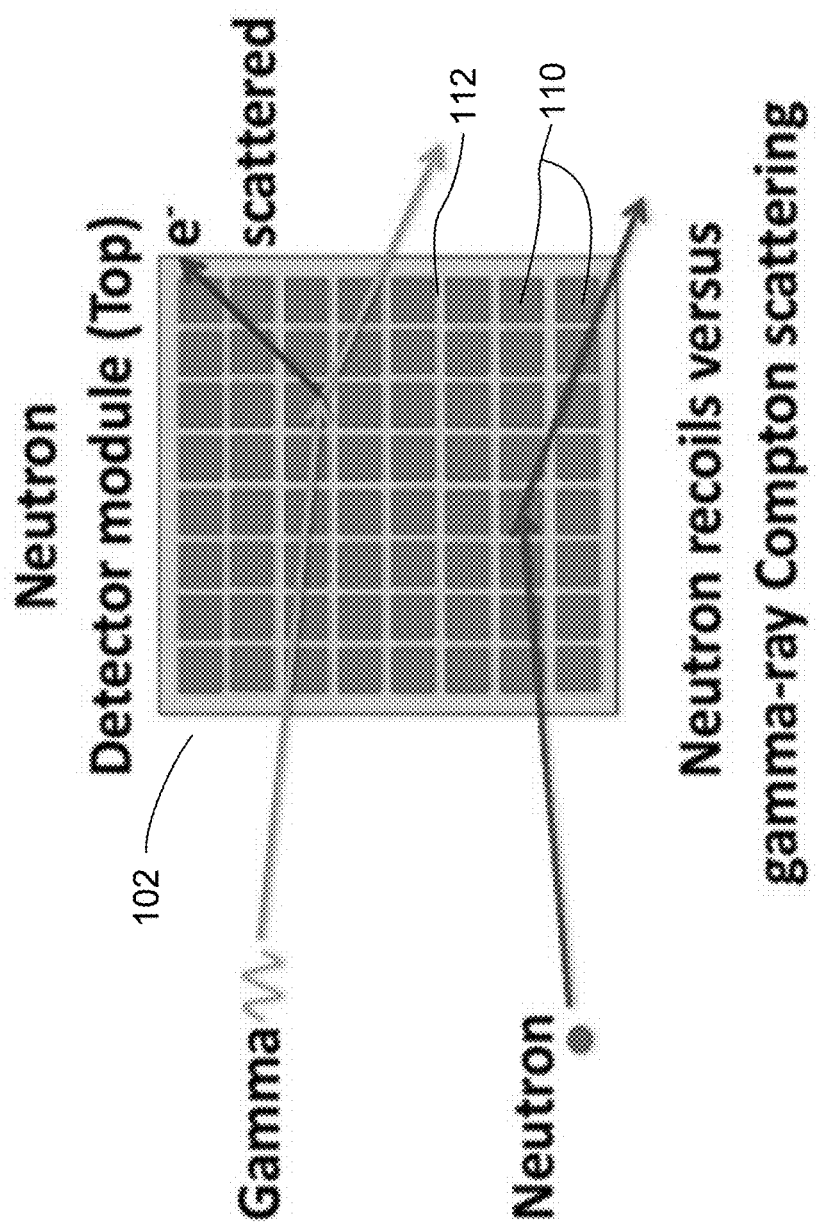
FIG. 1C shows a single bundle module illustrating the difference in fiber multiplicity between fast neutron recoils and gamma ray induced Compton scattering.

FIG. 1C shows a top view of one of the bundle modules (102) comprising a plurality of scintillators (110). For example, FIG. 1C shows a bundle module comprising 64 rods. Each scintillator (110) can be a plastic scintillator doped with neutron capturing agent lithium-6 ($^6$Li), and is sensitive to differences in gamma ray and neutron-induced interactions via the shape of the detected light signal. Neutron induced interactions on average produce a longer duration of scintillation light emission than gamma ray induced interactions. As shown in FIG. 1C, a fast neutron can bounce off of a single fiber, causing a single fiber event, and leave the bundle module. The neutron can only be captured once it has slowed down. A fast neutron will bounce off the single fiber (causing a single fiber event), and leave the module. The solid form of the scintillators (110) allows for fine-grained segmentation on a large scale. As further described in the following sections, the detection of a particle's position can allow the exemplary detector to discriminate the antineutrino events caused by nuclear fission from the fast neutron events caused by cosmic rays.

FIG. 1C also shows an exemplary embodiment where the scintillators (110) are separated from each other by a separator material (112). In some embodiments, the separator material (112) is a low-index refraction material to maximize total internal reflection of the light that propagates along the scintillators. One possible material for the low-index refraction material is aerogel.

Another possible separator material (112) is multiple steel foils (not shown in FIG. 1C). In such embodiments, each steel foil surrounds and supports each scintillator (110). For example, the steel foils can be thin sheets of steel with a few imprinted dimples or protrusions. The dimples allow the steel foil to support or hold in place the scintillator (110) by touching the scintillator (110) at only a few locations. A benefit of using a steel foil with a few dimples is that it minimizes the amount of contact between the steel foil and the scintillator to minimize the amount of light lost to the steel foil.

Electrons and positrons can be produced inside scintillator (110) by gamma rays or antineutrinos respectively. Fast neutron induced interactions produce heavier particles such as protons, tritons and alphas. The electrons and positrons travel further than heavy particles for the same initial energy. Since the thickness or diameter of the scintillators (110) is kept fairly thin (e.g., approximately 15 mm or less), the electrons and positrons are more likely to traverse over more than one scintillator bar, whereas the heavy ions tend to deposit their energy within a single scintillator bar. In this way, the exemplary detector's signal processing unit can distinguish between the two types of radiation based at least on the number of scintillator bars that detect a signal. Antineutrino detection requires the detection of a positron (a multi-rod event) followed by a subsequent neutron capture (single rod event), following an exponential time distribution with a mean of approximately 30 microseconds. The time difference between the positron detection and a neutron capture is a function of the amount of lithium-6 in the scintillators. Thus, the higher the amount of lithium-6 in the scintillators, the lower the time difference between the positron detection and the neutron capture. By contrast, a background caused by a fast neutron produces a proton recoil in one scintillator and is captured by another scintillator, both of which are single scintillator rod events. As further described in the following sections, the exemplary detector can distinguish between fast neutron events and antineutrino events based on a plurality of scintillators that produce a signal in each bundle module.

Returning to FIG. 1A the top surface of each bundle module can be a square shape with the same dimensions as a photomultiplier tube (e.g., length l of 5.0 cm). The height h of each bundle module is shown in FIG. 1B. In some embodiments, each bundle module can have a height h as long as permitted by the distance light can travel inside the scintillator rod. As an example, the height h of each bundle module can be 40 cm. In an exemplary embodiment, each scintillator (110) of FIG. 1C has a thickness of approximately 6 mm. In some embodiments, each scintillator (110) may have a thickness or diameter as small as 1.25 mm. One benefit of using thin plastic scintillators is that it can improve position sensitivity of the detector by allowing the detector to detect the location of the fiber that interacted with a particle. It should be noted that while FIGS. 1A-1C depict modules having a square cross-sectional areas, the shape is governed by the shape of the photomultiplier tube. Modules with circular, rectangular, or other cross-sections areas might also be considered if needed to fit a particular photomultiplier tube.

Figure 1D:
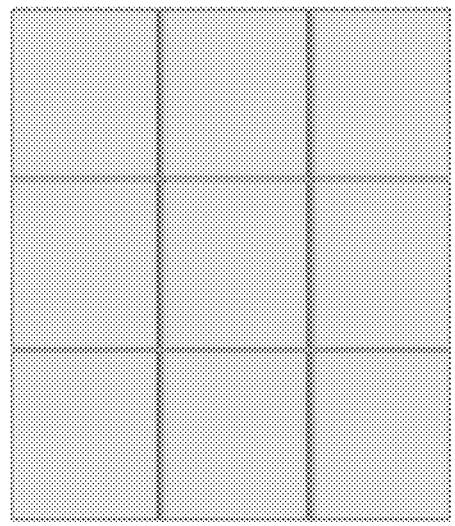
FIG. 1D shows a top view of an exemplary detector comprising nine bundle modules arranged in a three-by-three bundle module array.

FIG. 1D shows a top view of an exemplary detector comprising nine bundle modules arranged in a three-bythree module array. In such an exemplary configuration, a bundle module in the center can be fully protected by the bundle modules on the outside, observing less background. A benefit of such an exemplary configuration is that the direction of detected antineutrinos can be compared between the center bundle module and in the outside bundle modules to determine the effect of shielding.

Exemplary Particle Identification Detection

In an exemplary embodiment, scintillators with the capability to use pulse shape discrimination (PSD) respond differently to gamma ray and neutron-induced radiation. The different responses can be used to discriminate against neutron induced backgrounds. As noted earlier, such PSD plastic scintillators can be doped with a neutron capturing agent, such as $^6$Li.

Figure 2:
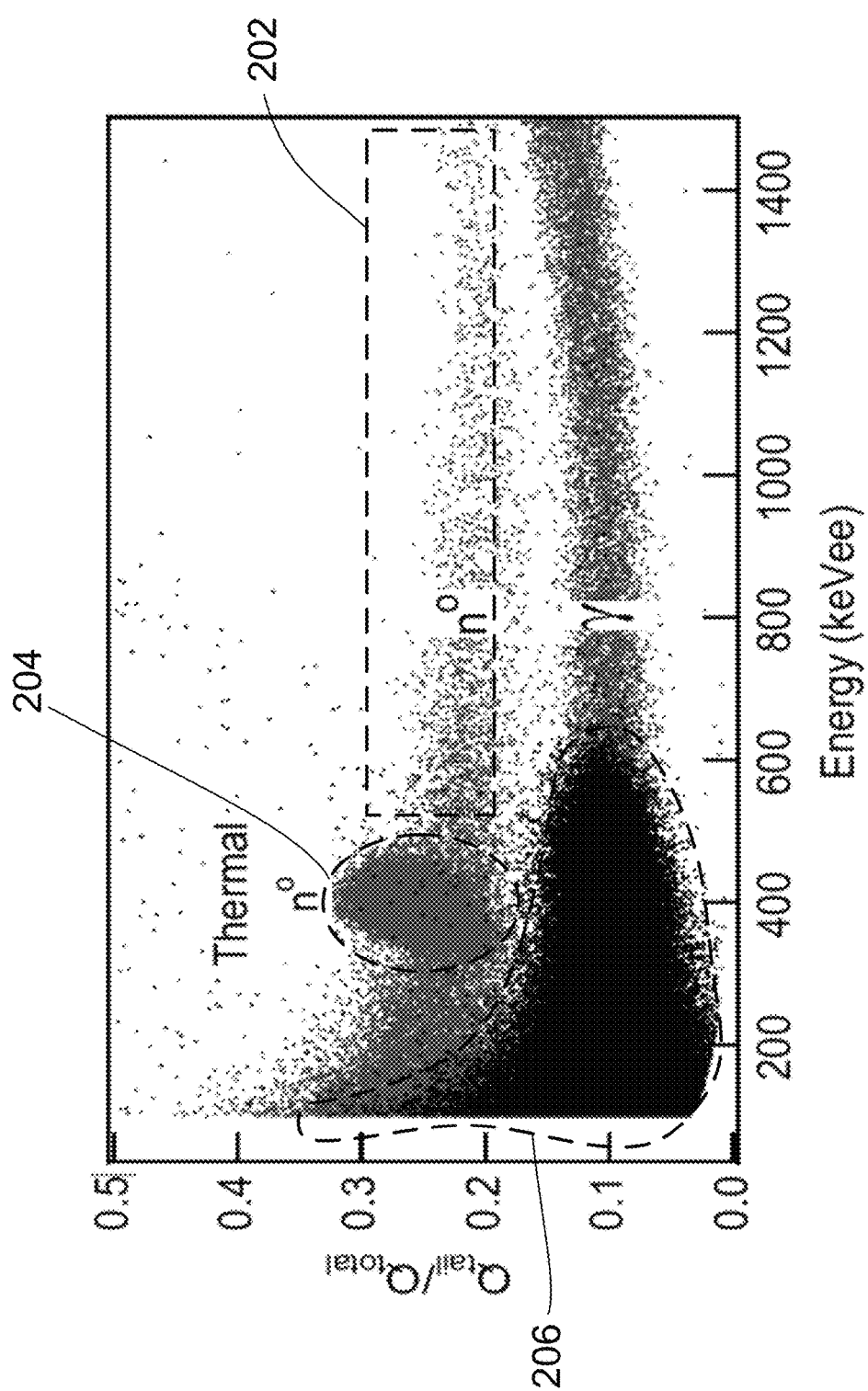
FIG. 2 shows a plot of a pulse shape sensitive parameter plotted as a function of energy for neutron and gamma ray induced interactions.

FIG. 2 shows a two-dimensional plot of the energy deposited in a sample of PSD plastic scintillator versus a pulse shape sensitive parameter from a sample of gamma rays and neutrons emitted from a $^{137}$Cs and a $^{252}$Cf source. The pulse shape parameter is the integral of the tail of each pulse divided by the total pulse integral (Qtail/Qtotal). Qtail is the charge of the tail part of a pulse shape, and Qtotal is the total charge of the pulse. Gamma ray events form the band near Qtail/Qtotal=0.1. The plot shown in the annotation (206) represents gamma rays emitted by both sources, and the data points outside the annotation (206) represent gamma rays and neutrons emitted by $^{252}$Cf. Pulses resulting from neutron induced interactions, such as proton recoils from fast neutrons ("n$^0$"), or neutron captures on $^6$Li ("Thermal n$^0$") produce heavy ions and a scintillation light pulse of relatively long duration and a larger Qtail/Qtotal value. Gamma ray induced pulses tend to be short duration and are marked by γ.

A neutron induced background event is caused by a fast neutron that hits a proton in one scintillator bar, recoils, and ends with a capture in another scintillator. As shown in annotated box (202) of FIG. 2, neutron induced recoil events form the band having a Qtail/Qtotal between 0.2 and 0.3 at all energies. As shown in annotated circle (204), neutron capture events form a group near 400 keV and Qtail/Qtotal near 0.3. Unlike fast neutrons, the neutron capture events associated with the antineutrino event are not preceded by recoil. Instead, the neutron capture event associated with the antineutrino event is preceded by a positron-like event.

The exemplary detector provides several benefits. For instance, as mentioned earlier, excellent particle position resolution provided by the position sensitive photomultiplier tubes can be used to reconstruct the direction of the incoming antineutrino, while the number of scintillator rods hit and the signal pulse shape are both sensitive to the type of particle. When these capabilities are combined, the detector can better discriminate against background. One benefit of the disclosed detector is that it can enable above ground detection of antineutrinos, a capability that would be beneficial to both the neutrino physics and non-proliferation communities as mentioned above. Additionally, the position resolution and particle ID capabilities may also enable a whole new class of fast neutron imaging detectors, less susceptible to pile-up caused by high gamma ray rates.

Figure 3A:
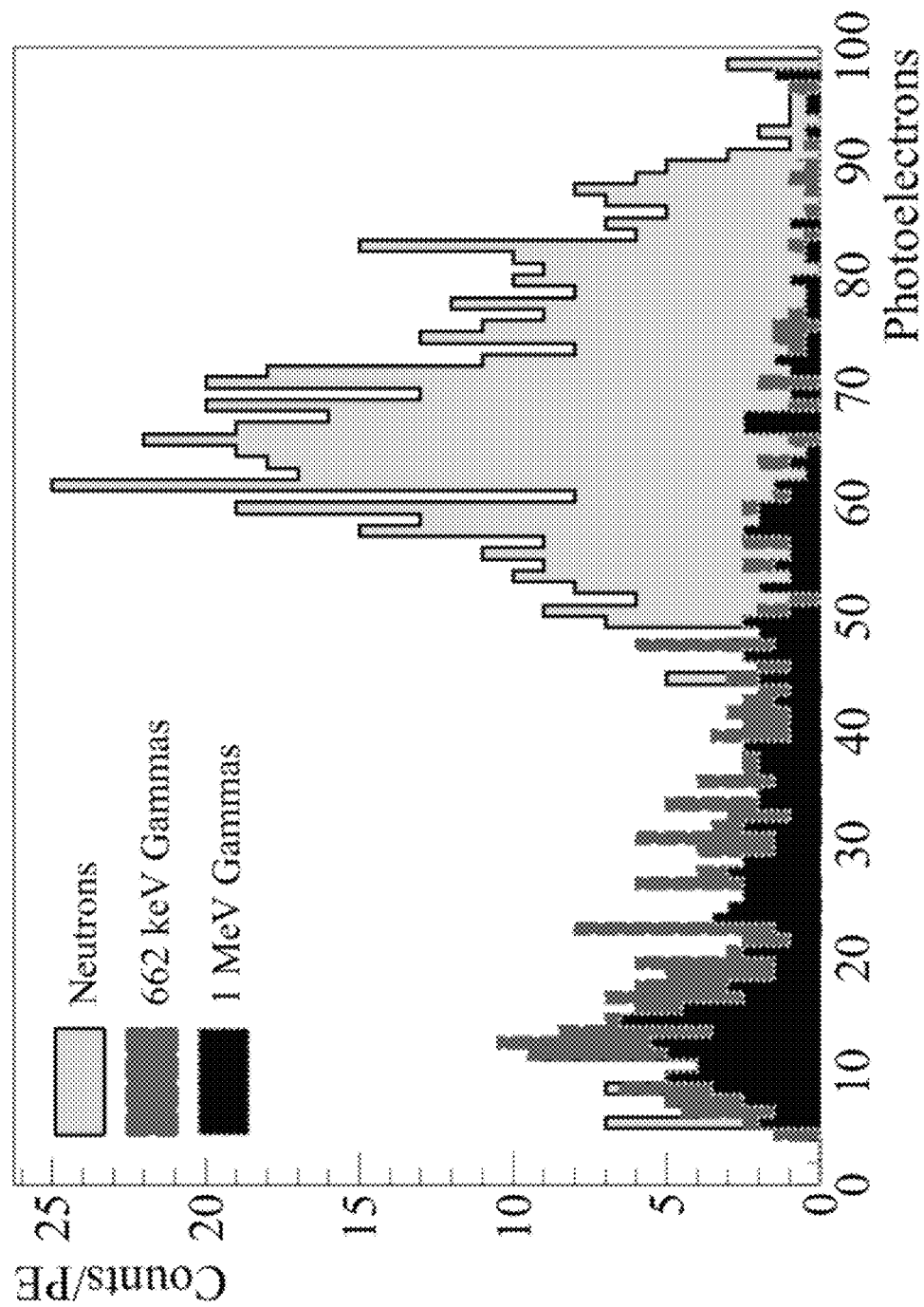
FIGS. 3A-3B show a response of a simulation of the exemplary detector to single fiber events for neutron captures, neutron induced proton recoils and gamma rays at different energies.
Figure 3B:
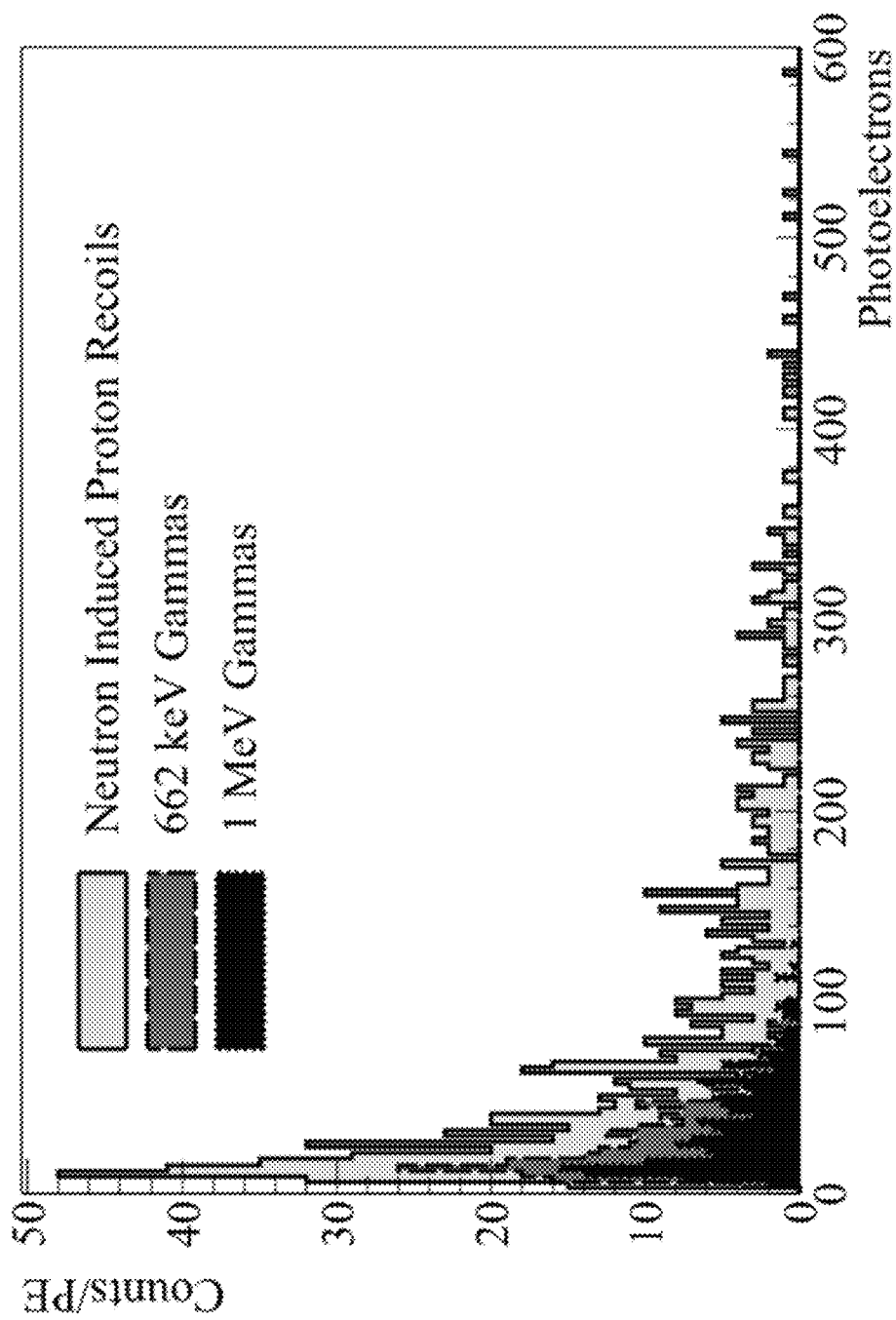

FIGS. 3A and 3B show a simulation of gamma ray and neutron induced events in the exemplary detector. Shown here are only the single scintillator bar events for neutron captures, neutron induced proton recoils and gamma rays at different energies. The neutron induced interactions in FIGS. 3A and 3B are produced by neutron captures and fast neutron recoils, respectively. In FIGS. 3A and 3B, the x-axis represents the measurement of the amount of light detected by the photomultiplier tube. The amount of light is proportional to the energy of the particle. As mentioned earlier, only the single scintillator bar events are shown in FIGS. 3A and 3B. The gamma ray induced events tend to have lower energy in these figures since the gamma ray induced interactions tend to shoot across multiple bars, as shown in FIG. 1C. Only low energy gamma ray events can be contained within a single bar. A single bar event selects in favor of heavy neutron-like interactions such as neutron or proton recoil and capture.

In FIG. 3A, the neutron capture peak is about 60 to 70 photoelectrons for single scintillator bar events, and the exemplary detector's response is dominated by neutron captures between approximately 50 and 90 photoelectrons.

FIGS. 3A-3B also show single scintillator bar events associated with two different gamma ray energies at 662 keV and 1 MeV. As gamma ray energy increases, the gamma rays interact with more than one plastic scintillator bar more often, reducing the number of single bar events. Thus, an increase in gamma ray energy reduces the number of single-bar events. FIGS. 3A-3B illustrate that the number of single bar events for 1 MeV gamma ray is less than the number of single bar events for 662 keV gamma rays. FIG. 3A shows that the elimination of multi-bar events reduces gamma rays relative to neutron captures by a factor of approximately ten for a $^6$Li doped fiber. FIG. 3B shows that the elimination of multi-bar events reduces the gamma ray interactions relative to fast neutron induced proton recoils by a factor of approximately five.

Returning to FIG. 1C, in some embodiments, thin rods of plastic scintillators (110) can be arranged in a square array in each bundle module for antineutrino detection. The plastic scintillators (110) are coupled to two photomultiplier tubes (PMTs) (not shown in FIG. 1C). In one configuration, two multi-anode PMT are coupled to the plastic scintillators where a multi-anode PMT is coupled to the top and bottom of each bundle module comprising a plurality of plastic scintillators. A benefit of using multi-anode PMTs is that it allows the scintillation light produced by each scintillator (110) to be read out on separate channels. This can be used to determine the position of the scintillator bar that was hit. In some embodiments, the plastic scintillators (110) are coupled at both ends to the PMTs. A benefit of having scintillators coupled at both ends to the PMTs is that it can provide the location of a hit in the vertical or z-axis, which is along height h in FIG. 1B. Scintillation light produced in any of the scintillators travels up and down via total internal reflection to the PMT anode coupled to that scintillator, and results in the generation of an associated electrical signal corresponding to each capture event at the output of the PMT. The signal thus produced enables a determination of the position and energy of each particle interaction that occurs in one or more of the scintillator bars, as well as the shape of the electrical signal pulse produced by the photomultiplier tube. These signal characteristics are sensitive to whether the original particle interaction was caused by an antineutrino, or a neutron, or a gamma-ray. In some embodiments, the pulse-shape, number of scintillator bars producing a signal, and direction can be used independently to confirm if the original interaction was caused by an antineutrino. The electrical signals are received and processed by a signal processing unit (not shown) to identify the events.

For reactor antineutrino detection, the Inverse Beta Decay (IBD) reaction on free protons is used:

$$\bar{v}_e + p \rightarrow e^+ + n$$

where $\bar{v}_e$ is an electron antineutrino, p is a proton, e⁺ is a positron, and n is a neutron.

The exemplary detector correlates the final state positron and neutron in position and time. In some embodiments, scintillators (110) are arranged vertically so that the fine-grained segmentation and multi-anode PMT readout reveal the position of the positron and neutron capture in the horizontal plane. The horizontal plane or x-y plane is a plane that is perpendicular to the vertical arrangement of the scintillators (110). In each bundle module, the scintillators (110) are arranged in a parallel orientation with respect to a vertical axis or the height h (as shown in FIG. 1B) of the bundle module. In such an embodiment, the positron is detected as a prompt event with a typical energy of a few MeV. At the end of its track, the positron annihilates with an electron, producing two gamma rays. The neutron, with only approximately 10 keV of energy, is captured some time later on a scintillator bar (110) following thermalization.

In an exemplary embodiment, the differences between neutron induced interactions and gamma rays can be resolved based on detections from a plurality of scintillators. For example, for fast neutron induced proton recoils, or neutron capture on ⁶Li, the resulting heavy ions deposit the bulk of their energy within a single plastic scintillator. However, Compton scattered electrons deposit their energy over a longer range and produce light in multiple contiguous or adjacent plastic scintillators. Positrons that result from antineutrino interactions can deposit energy in multiple plastic scintillators. But positrons typically deposit their energy in up to three non-contiguous or non-adjacent plastic scintillator locations depending upon whether the annihilation gamma rays deposit energy inside the detector. The exploitation of differences in range and scintillator multiplicity adds another independent discriminant to differentiate rare particle interactions, allowing neutron-gamma pulse shape differences to be exploited by the exemplary detector's signal processing unit. It is possible to implement a trigger system that is sensitive to, and exploits the scintillator multiplicity in order to eliminate background events.

Exemplary Particle Position and Particle Direction Detection

For antineutrino detection, the fine-grained segmentation afforded by the use of a plurality of scintillators produces a position reconstruction in a plane, and enables the reconstruction of the direction of the incoming antineutrino flux. A simulation of the process of detecting positron and neutron performed by the inventors shows that the relative positions of the positron and neutron capture produce direction vectors that on average point directly away from the direction of the reactor source, enabling a reconstruction of the direction of the incoming antineutrino flux. Further discrimination against fast neutron background can be achieved via the plurality of scintillators for each of the particle interactions. Positrons with energy of a few MeV and the resulting annihilation gamma rays will often deposit energy in multiple scintillators. Neutron captures on ⁶Li doped scintillators result in a triton and an alpha, both heavy ions that generally deposit all their energy within a single plastic scintillator rod. Thus, the plurality of scintillators described earlier, combined with the direction sensitive vectors and the pulse shape information allow the exemplary detector to discriminate against cosmogenic neutron background.

Figure 4A:
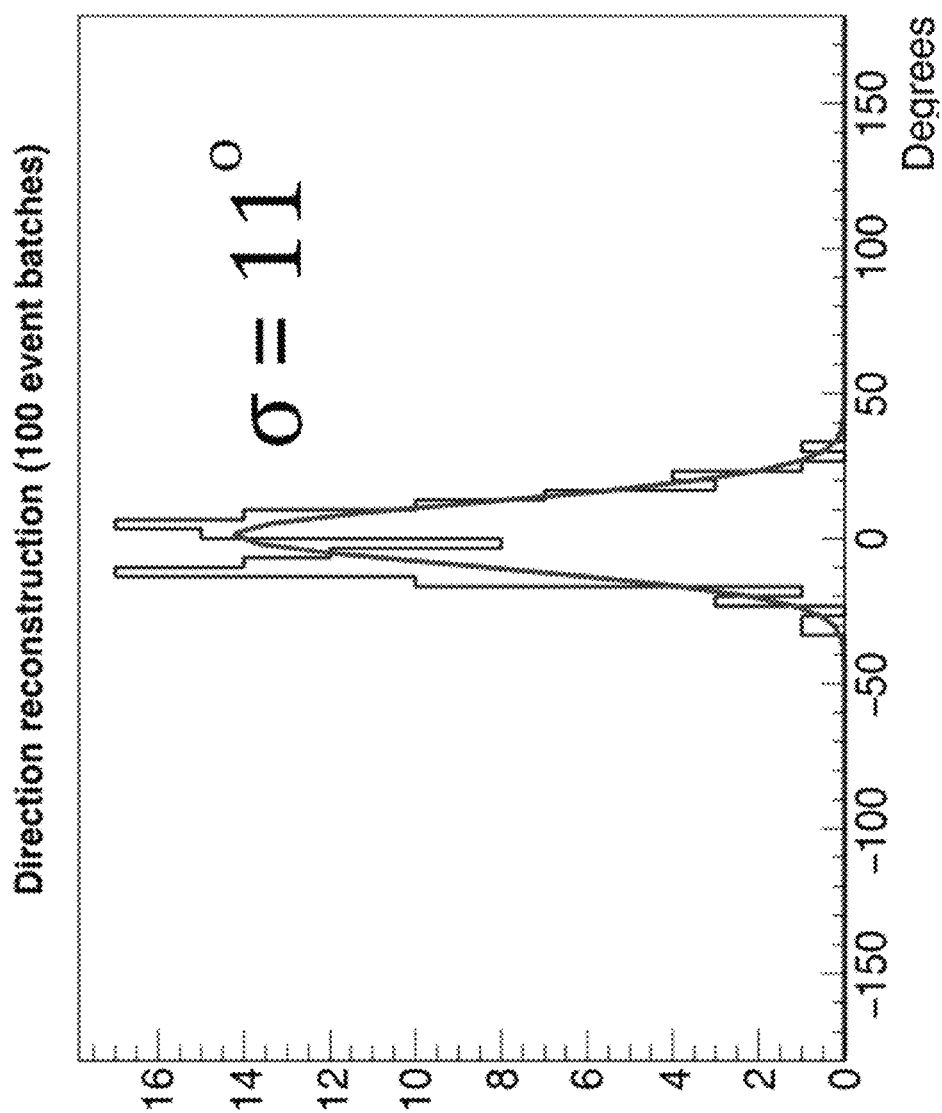
FIG. 4A shows a simulation of direction vectors of antineutrino flux reconstructed by the exemplary detector.
Figure 4B:
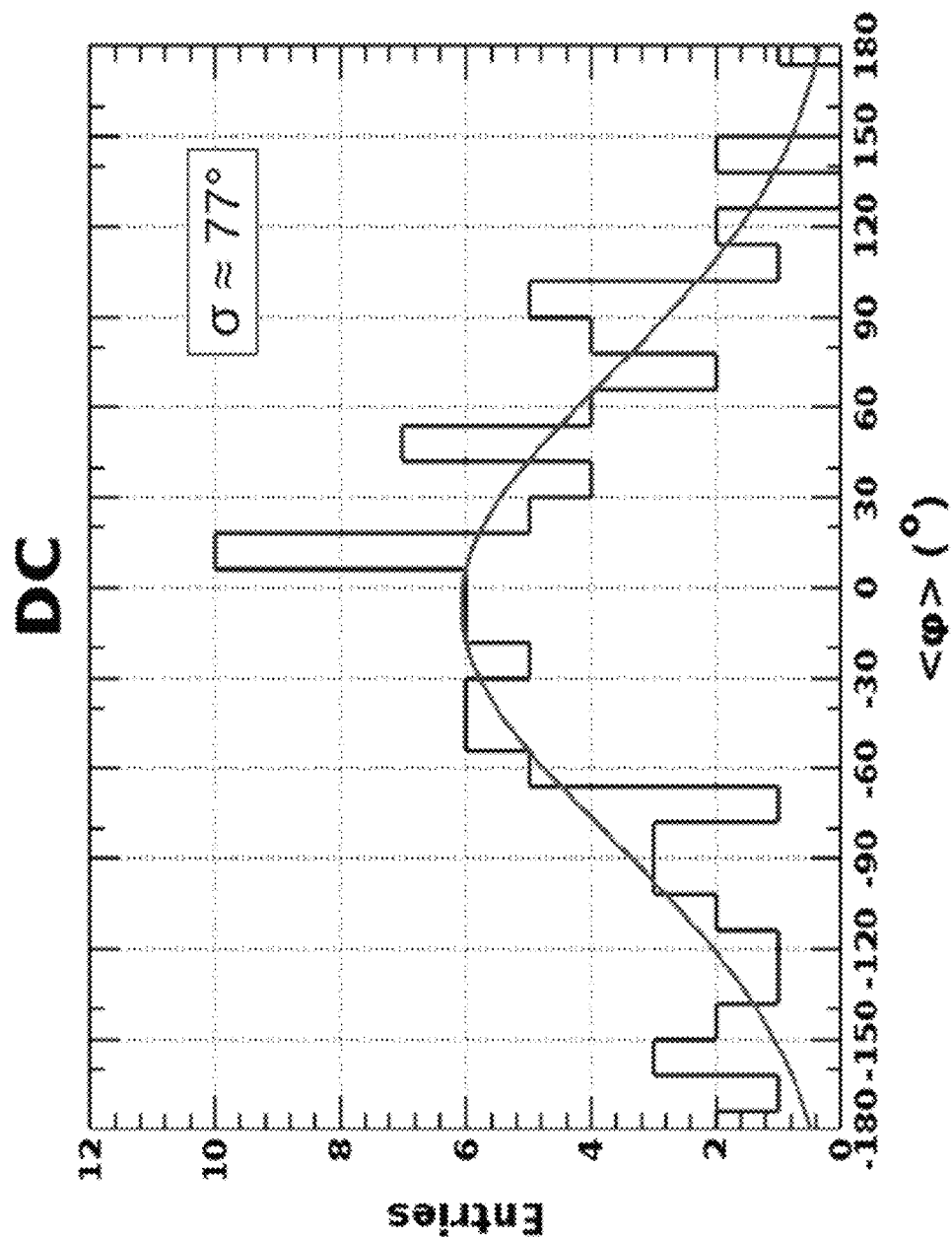
FIG. 4B shows a simulation of direction vectors of antineutrino flux reconstructed by a conventional detector.

FIGS. 4A-4B shows simulations of reconstructed direction vectors resulting from batches of 100 antineutrino events. FIG. 4A shows a simulation of the direction vectors of a set of 100 event batches of antineutrinos reconstructed by the exemplary detector, whereas FIG. 4B shows a simulation of a set of 100 event batches reconstructed by a conventional detector, such as a Double CHOOZ detector. In FIGS. 4A and 4B, the smooth line represents a best fit line for the jagged data points. The relative improvement in directional precision (as evident from the smaller standard deviation, a, and thus the higher confidence in the reconstructed direction vector) is striking. This improvement is largely due to the improvement in position resolution available via the segmentation of the plastic scintillators.

Figure 5:
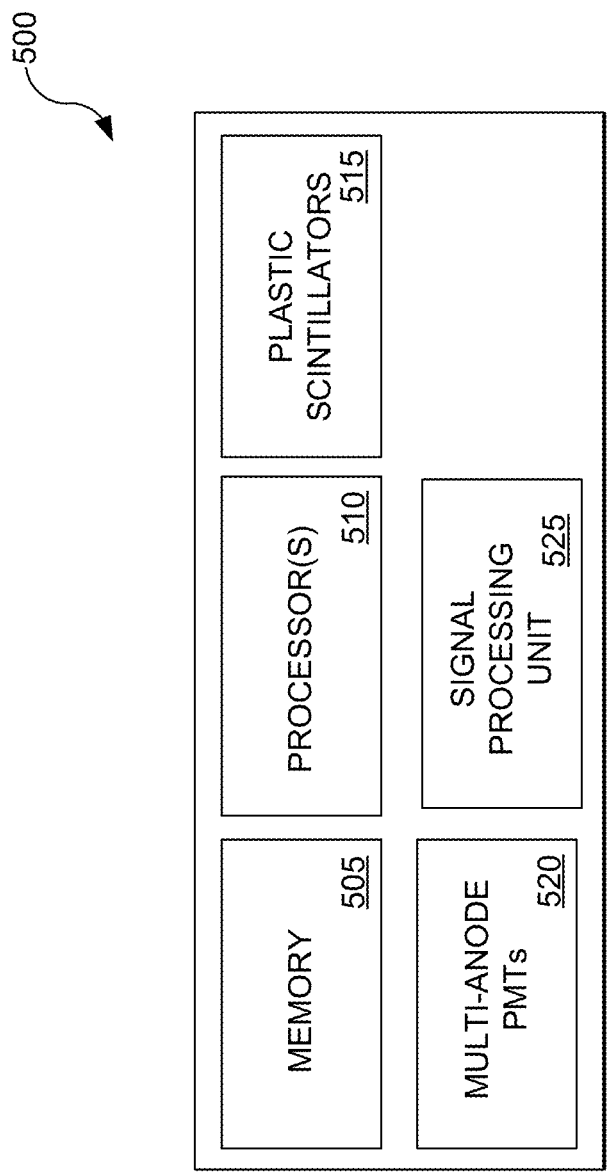
FIG. 5 shows a block diagram for the exemplary detector.

FIG. 5 shows a block diagram for the exemplary detector. In some embodiments, the different blocks in FIG. 5 may be located in separate locations. For example, a detector (500) may include a plurality of bundle modules, where each bundle module comprises a plurality of scintillators (515) and two position sensitive light detection devices, such as PMTs (520) coupled to the scintillators (515). The detector (500) also includes a signal processing unit (525) a memory (505), and at least one processor (510) that may be located in a separate location, such as in a separate box next to the bundle modules.

The position sensitive PMT (520) is coupled to the signal processing unit (525). In some embodiments, the signal processing unit (525) includes at least one processor (510) and a memory (505) having instructions stored thereupon, wherein the instructions upon execution by at least one processor, configure the signal processing unit to perform several operations. For instance, as further described below, the signal processing unit (525) can determine the positions of each positron and neutron capture event. Based on the position information, the signal processing unit (525) can also construct a horizontal direction vector for every positron-neutron pair. In some embodiments, a vector sum over a batch of event pairs results in an estimate of the antineutrino flux direction.

The signal processing unit (525) and associated memory stores a set of detected events that comprise data related to the detection of antineutrino events and data related to the detection of the fast neutron events. In some embodiments, the signal processing unit (525) stores the set of detected events in a memory (505) or in a hard drive. As discussed in the sections below, by determining the vectors between the protons and neutrons associated with the fast neutron event, the signal processing unit (525) can capture the fast neutron events generated by cosmic rays and can subtract or remove such events from a set of detected events that also includes the antineutrino events detected by the exemplary detector.

Exemplary Detection of Nuclear Fission Produced Antineutrinos

The signal processing unit (525) receives electrical signals produced by the detector to detect antineutrinos. To this end, the signal processing unit (525) identifies the detection of an antineutrino produced by nuclear fission when a positron event occurs and is followed in time (by approximately 30 microseconds) by detection of a neutron in a single scintillator. In some implementations, the time of detection between a positron and a neutron capture can follow an exponential time distribution with a mean of approximately 30 microseconds. A positron event itself is identified by the detection of a positron like event, followed by the detection of two gamma rays. Neutrons associated with an antineutrino interaction are captured in a single scintillator.

One way to distinguish an antineutrino from fast neutrons is to determine the direction of the vector defined by the positions of the positron and neutron capture. The direction vectors for the antineutrinos on average point away from the center or core of the nuclear reactor, whereas the direction vectors for the fast neutrons point in random directions. In an exemplary embodiment, the detection of a positron event is used by the signal processing unit (525) to detect the position of the positron in the horizontal plane or x-y plane. The subsequent detection of the neutron capture event marks a position of the neutron in x-y plane. The signal processing unit (525) computes a vector between the detected position of the positron and the detected position of the neutron. For antineutrino generated by the nuclear fission, the average direction of the computed vector points away from the source of radiation.

Exemplary Detection of Cosmic Ray Produced Fast Neutrons

To distinguish antineutrinos from fast neutrons produced by cosmic rays, the signal processing unit (525) also identifies and detects the direction vectors associated with fast neutrons. To detect a fast neutron, the signal processing unit (525) detects a proton recoil event followed by a neutron capture event. When a fast neutron interacts with one of the scintillators, the fast neutron hits a proton and recoils. The proton deposits its energy in the same plastic scintillator. Subsequently, the fast neutron slows down and is captured by another plastic scintillator. The neutron capture event results in a flash of light.

The signal processing unit (525) of the exemplary detector can also identify the direction of the fast neutron. For example, the detection of a proton event can also be used by the signal processing unit (525) to detect the position of the proton in a horizontal plane or x-y plane. The subsequent detection of the neutron capture event can also be used by the signal processing unit (525) to construct a vector between the proton recoil event and the neutron capture event. The signal processing unit (525) draws a vector between the detected position of the proton and the detected position of the neutron capture. For fast neutrons generated by cosmic rays, signal processing unit (525) can determine that the vectors between the detected protons and neutrons, when summed over a number of detections, do not point in a particular direction.

Figure 6:
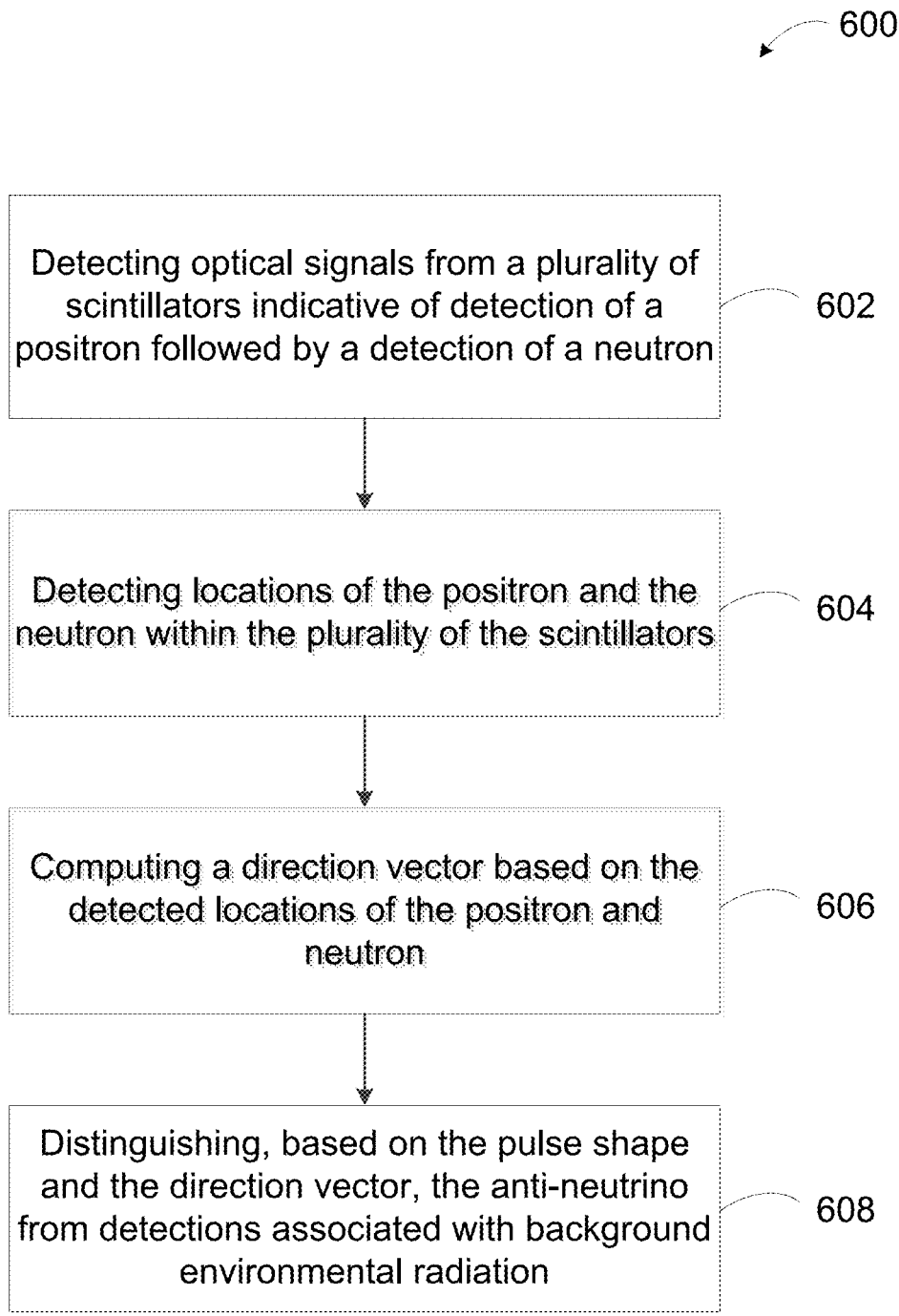
FIG. 6 shows an exemplary flowchart for anti-neutrino detection.

FIG. 6 shows an exemplary flowchart (600) for detecting an antineutrino. At the detecting operation (602), optical signals are detected from a plurality of scintillators indicative of detection of a positron. In some implementations, approximately 30 microseconds later, an optical signal from a single scintillator indicates the detection of a neutron capture. The optical signal from the neutron capture additionally produces an electrical signal having a particular pulse shape characteristic that is different from pulse shape characteristic associated with background environmental radiation and is detected from a single scintillator. At the location detecting operation (604), locations of the positron and the neutron are detected within the plurality of the scintillators. At the computing operation (606), a direction vector is computed based on the detected locations of the positron and neutron. At the distinguishing operation (608), the pulse shape and the direction vector are used to distinguish the antineutrino from detections associated with background environmental radiation.

Reactor antineutrino detection is of great interest to both the physics and non-proliferation communities. A challenge that impacts the deployability and design of conventional detectors is the high flux of fast cosmogenic neutrons at the earth's surface, forcing conventional detectors underground, and requiring large volumes of hydrogenous shielding around the conventional detector. The exemplary detector design obtains the fine-grained position and particle identification information needed to reconstruct the direction of the incoming reactor antineutrino flux. Sensitivity to the direction of an incoming antineutrino flux provides a powerful discriminant for the exemplary detector and can allow both above ground deployments and a reduction in hydrogenous shielding requirements.

In some embodiments, a computer program (also known as a program, software, software application, script, or code) can be written in any form of programming language, including compiled or interpreted languages, and it can be deployed in any form, including as a stand alone program or as a module, component, subroutine, or other unit suitable for use in a computing environment to carry out at least some of the disclosed operations. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be stored on a tangible and non-transitory computer readable medium and deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A particle detector, comprising:
   a plurality of optical bundle modules, each optical bundle module comprising a plurality of individual scintillators arranged in a vertical orientation and separated from one another within the optical bundle module;
   one or more photomultiplier tubes coupled to the plurality of scintillators, the one or more photomultiplier tubes configured to receive light from one or more of the scintillators produced in response to interactions of a particle or a ray emanating from an antineutrino interaction with the one or more scintillators and to generate an associated electrical signal; and
   a signal processing unit comprising a processor and a memory including instructions stored thereon, the signal processing unit coupled to the one or more photomultiplier tubes to receive electrical signals associated with the interactions of the particle or the ray with the one or more scintillators, wherein the instructions upon execution by the processor configure the signal processing unit to identify the particle or the ray based on at least reception of electrical signals from the plurality of scintillators in a temporal sequence that is indicative of detection of a first type of particle, and reception of electrical signals from a single scintillator that is indicative of detection of a second type of particle.

2. The particle detector of claim 1, wherein the particle or the ray is identified based on a pulse shape associated with the detected particle or ray, wherein the pulse shape is indicative of an energy characteristic of the particle or ray and enables the particle or ray to be distinguished from detections associated with background environmental radiation.

3. The particle detector of claim 1, wherein the particle detector is configured to operate and identify the particle or the ray at above ground level.

4. The particle detector of claim 1, wherein the signal processing unit is configured to discriminate against detections due to background radiation by ignoring detections associated with Compton-Scattered electrons that appear in temporal proximity of one another in more than two adjacent scintillators.

5. The particle detector of claim 1, wherein each scintillator is a plastic scintillator doped with lithium-6.

6. The particle detector of claim 1, wherein each scintillator has a thickness of less than or equal to 15 millimeters.

7. The particle detector of claim 1, wherein the plurality of individual scintillators in each optical bundle module is arranged in a square array.

8. The particle detector of claim 1, wherein the photomultiplier tubes are multi-anode photomultiplier tubes.

9. The particle detector of claim 1, further comprising:
   a low-index refraction material that separates each of the plurality of individual scintillators.

10. The particle detector of claim 9, wherein the low-index refraction material is aerogel.

11. The particle detector of claim 1, further comprising:
    a plurality of steel foils to support the plurality of individual scintillators, wherein each steel foil comprising a plurality of protrusions that support an individual scintillator.

12. The particle detector of claim 1, wherein the plurality of optical bundles modules is nine optical bundles modules arranged in a three-by-three array.

13. The particle detector of claim 1, wherein the plurality of optical bundle modules is located above ground next to a nuclear reactor containment vessel.

14. The particle detector of claim 1, wherein a top surface of each optical bundle module has a square shape with a predetermined length, and a predetermined height.

15. The particle detector of claim 1, wherein the plurality of scintillators are coupled to two photomultiplier tubes configured to receive light from both ends of the scintillators.

16. A particle detector, comprising:
    a plurality of optical bundle modules, each optical bundle module comprising a plurality of individual scintillators arranged in a vertical orientation and separated from one another within the optical bundle module;
    one or more photomultiplier tubes coupled to the plurality of scintillators, the one or more photomultiplier tubes configured to receive light from one or more of the scintillators produced in response to interactions of a particle or a ray emanating from an antineutrino interaction with the one or more scintillators and to generate an associated electrical signal; and
    a signal processing unit comprising a processor and a memory including instructions stored thereon, the signal processing unit coupled to the one or more photomultiplier tubes to receive electrical signals associated with the interactions of the particle or the ray with the one or more scintillators, wherein the instructions upon execution by the processor configure the signal processing unit to identify the particle or the ray based on a number of scintillators producing electrical signals in response to the particle or the ray, a direction of detections produced in response to the particle or the ray, or a pulse shape associated with the detected particle or ray,
    wherein the particle or ray is identified as an antineutrino upon a detection of a positron followed by a detection of a neutron, wherein the neutron has an identifiable pulse shape characteristic and is detected from a single scintillator.

17. The particle detector of claim 16, wherein the first pulse shape is associated with a Qtail/Qtotal of between 0.2 to 0.3, where Qtail is a charge of a tail part of the first pulse shape and Qtotal is a total charge of the first pulse shape.

18. The particle detector of claim 16, wherein a period of time between the detection of the positron and the detection of the neutron follows an exponential time distribution with a mean of approximately 30 microseconds.

19. The particle detector of claim 16, wherein the signal processing unit is configured to determine an incoming direction of the antineutrino by computing a direction vector based on detected locations of the positron and the neutron within the plurality of the scintillators.

20. The particle detector of claim 16, wherein the signal processing unit is configured to identify the positron detection associated with the antineutrino upon detections from up to three non-adjacent scintillators.

21. A method for detecting an antineutrino, comprising:
   detecting optical signals from a plurality of scintillators indicative of detection of a positron followed by a detection of a neutron, wherein the optical signal indicative of detection of the neutron produces an electrical signal having a particular pulse shape characteristic that is different from pulse shape characteristic associated with background environmental radiation and is detected from a single scintillator;
   detecting locations of the positron and the neutron within the plurality of the scintillators;
   computing a direction vector based on the detected locations of the positron and neutron; and
   distinguishing, based on the pulse shape and the direction vector, the antineutrino from detections associated with background environmental radiation.

22. The method of claim 21, wherein:
   the positron is detected from up to three non-adjacent scintillators, and
   the pulse shape associated with the neutron is obtained based on a ratio of Qtail/Qtotal having a value between 0.2 to 0.3, where Qtail is a charge of a tail part of the pulse shape and Qtotal is a total charge of the pulse shape.

23. The method of claim 21, wherein a period of time between the detection of the positron and the detection of the neutron follows an exponential time distribution with a mean of approximately 30 microseconds.

24. The method of claim 21, further comprising:
   discriminating against detections due to the background environmental radiation by removing detections associated with Compton-Scattered electrons that appear in temporal proximity of one another in more than two adjacent scintillators.

25. The method of claim 21, wherein each scintillator is a plastic scintillator doped with lithium-6.

26. The method of claim 21, wherein each scintillator has a thickness of less than or equal to 15 millimeters.

27. The method of claim 21, wherein the scintillators are included in a plurality of optical bundle modules, each optical bundle module comprising a plurality of individual scintillators arranged in a vertical orientation and separated from one another within the optical bundle module.

28. The method of claim 21, further comprising:
   detecting locations of additional positrons and neutrons following thereafter within the plurality of the scintillators associated with additional antineutrino particles;
   computing direction vectors based on the detected locations of the positrons and neutrons for each additional antineutrino particle; and
   determining a direction of a source of antineutrino particles upon a determination that the computed direction vectors point to a particular direction with a particular level of certainty.

29. The method of claim 28, wherein the particular level of certainty is determined based on a standard deviation associated with the computed direction vectors.

* * * * *